United States Patent [19]
Campagnuolo et al.

[11] Patent Number: 5,677,612
[45] Date of Patent: Oct. 14, 1997

[54] LEAD-ACID BATTERY DESULFATOR/ REJUVENATOR

[75] Inventors: Carl Campagnuolo, Potomac, Md.; Louis P. Jarvis, Brick, N.J.; Anthony Pellegrino, Middletown, N.J.; Joseph DiCarlo, Long Branch, N.J.; William Keane, Colts Neck, N.J.

[73] Assignee: The United States of America as represented by the Secretary of the Army, Washington, D.C.

[21] Appl. No.: 700,332

[22] Filed: Aug. 2, 1996

[51] Int. Cl.⁶ ............................................. H01M 10/46
[52] U.S. Cl. ............................................................ 320/4
[58] Field of Search ........................... 320/3, 4, 10, 12, 320/13, 14, 21, 29, 30, 31, 32, 39, 43, 48

[56] References Cited

U.S. PATENT DOCUMENTS

| | | | |
|---|---|---|---|
| 4,728,877 | 3/1988 | Adamson | 320/4 X |
| 4,871,959 | 10/1989 | Gali | 320/61 |
| 5,063,341 | 11/1991 | Gali | 320/21 |
| 5,084,664 | 1/1992 | Gali | 320/61 |
| 5,166,595 | 11/1992 | Leverich | 320/32 |
| 5,276,393 | 1/1994 | Gali | 320/21 |
| 5,491,399 | 2/1996 | Gregory et al. | 320/21 X |
| 5,543,701 | 8/1996 | Leung et al. | 320/4 |

*Primary Examiner*—Edward Tso
*Attorney, Agent, or Firm*—Freda L. Krosnick; Frank J. Dynda

[57] ABSTRACT

A lead-acid (SLI) battery desulfator which is powered by the batteries which it is conditioning when a motor associated with the batteries is off. The desulfator activates whenever an alternator supplies charge to the battery then deactivates itself upon expiration of a set time or is reset upon starting of the motor.

8 Claims, 6 Drawing Sheets

TIMER CIRCUIT

LEAD-ACID BATTERY DESULFATOR/REJUVENATOR

RIGHTS OF THE UNITED STATES GOVERNMENT

The invention described herein may be manufactured, used and licensed by or for the United States Government for governmental purposes without payment to us of any royalty thereon.

BACKGROUND OF THE INVENTION

1. Field of the Invention

The present invention relates to the field of lead-acid battery life extension. The invention has military and non-military uses. The invention addresses the problem of short life time of secondary lead-acid batteries that are used intermittently.

2. Description of the Prior Art

Present systems employ solar panels which provide a voltage to a multivibrator (electronic oscillator); the oscillator in turn provides a small energy pulse to the battery plates so that small amounts of lead sulfate are removed from the plates of the battery and go back into the electrolyte. In so doing the battery is rejuvenated or cleansed.

The problem with this technique is that one must use a solar panel which must be placed outside the battery compartment, i.e. on the roof of a vehicle, on the dashboard or in other areas where the sunlight can be collected and transformed into electrical energy to power the multivibrator. Wires must be routed from the solar panel through the vehicle cabin to the battery location. Other vehicles and equipment have two sets of batteries in parallel each set located on either side of the engine compartment. In this case wires to connect the two batteries in parallel must be routed through the engine compartment. In addition, solar panels are expensive and for a system such as a solargizer described in U.S. Pat. No. 5,063,341 can account for more than half of the cost of the pulse system.

It is the purpose of the present invention to bring forth a system which does not use solar panels to power the multivibrator. This system is not only low cost, but it is free of the problems mentioned above. The system will be placed under the hood of the vehicle adjacent to the battery compartment, or near the batteries when used in mechanized apparatus or other power equipment.

SUMMARY OF THE INVENTION

The battery desulfator takes a small amount of energy from the battery, passes through the multivibrator which in turn delivers low power high frequency pulses to its lead plates. The amount of current from the battery to the desulfator is controlled by resistance. A fuse is also utilized to prevent against damage to the multivibrator circuit.

One version of the desulfator uses a timer circuit to keep the desulfator on for a period of time after vehicle, equipment, or apparatus start. In order to prevent total drain of the battery being desulfated, the timer turns off the desulfator after a period of time.

Another version of the desulfator has the capability of varying the frequency of the output pulses proportionally to the state of charge of the battery.

BRIEF DESCRIPTION OF THE DRAWINGS

A better understanding of the invention will be obtained when the following detailed description of the invention is considered in connection with the accompanying drawings in which.

DESCRIPTION OF THE PREFERRED EMBODIMENTS

Figure 1:
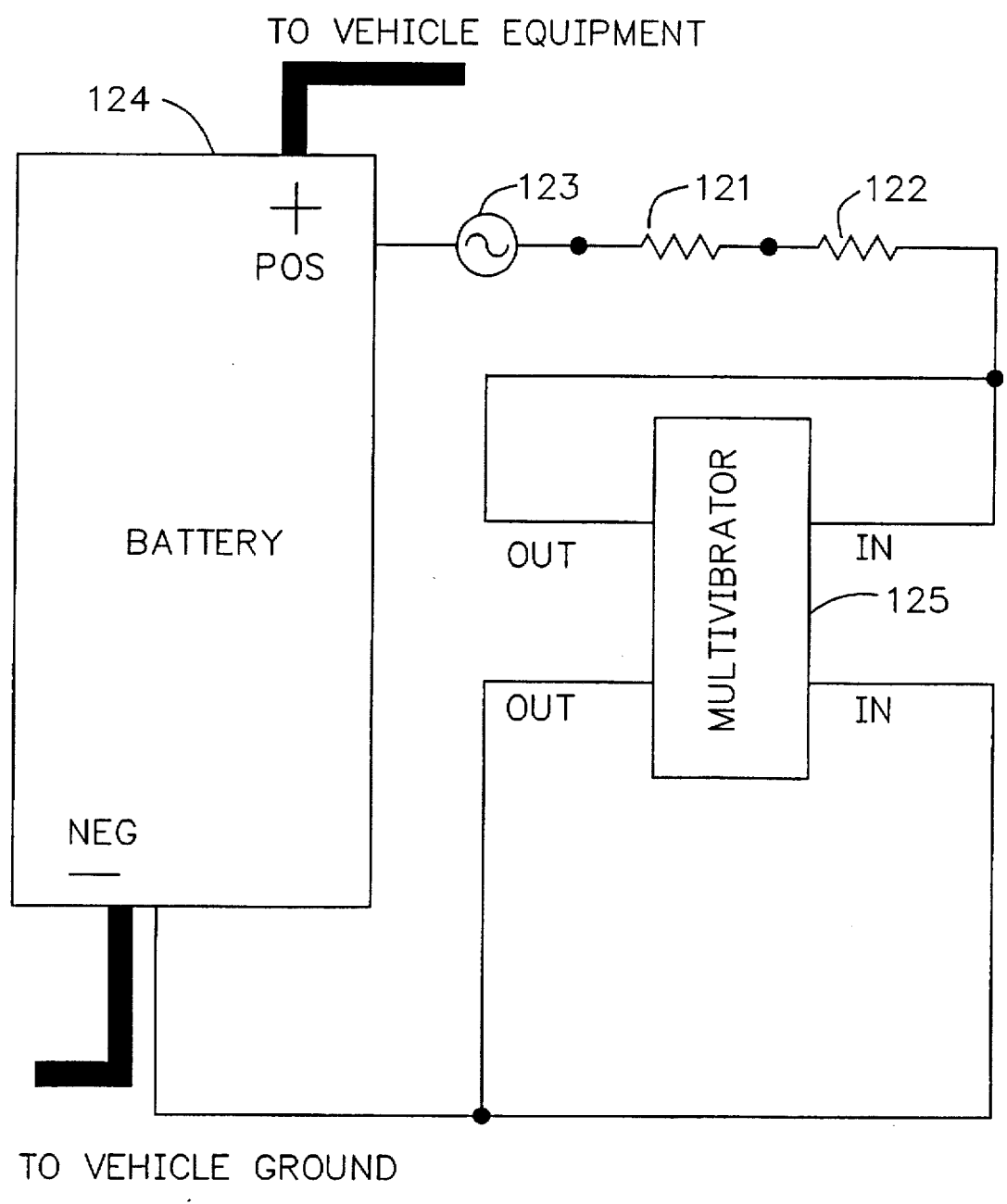
FIG. 1 shows a block diagram schematic for a 12 volt battery desulfator system for use in a motor vehicle.

Referring to FIG. 1, the battery desulfator operates by taking a small amount of energy from the battery 124, which passes through the oscillator or multivibrator 125, which in turn transforms the battery dc voltage into high frequency pulses which are fed back into the battery 124 through resistors 121 and 122, and fuse 123 which is present to avert battery damage should any component in the multivibrator 125 fail.

Figure 2:
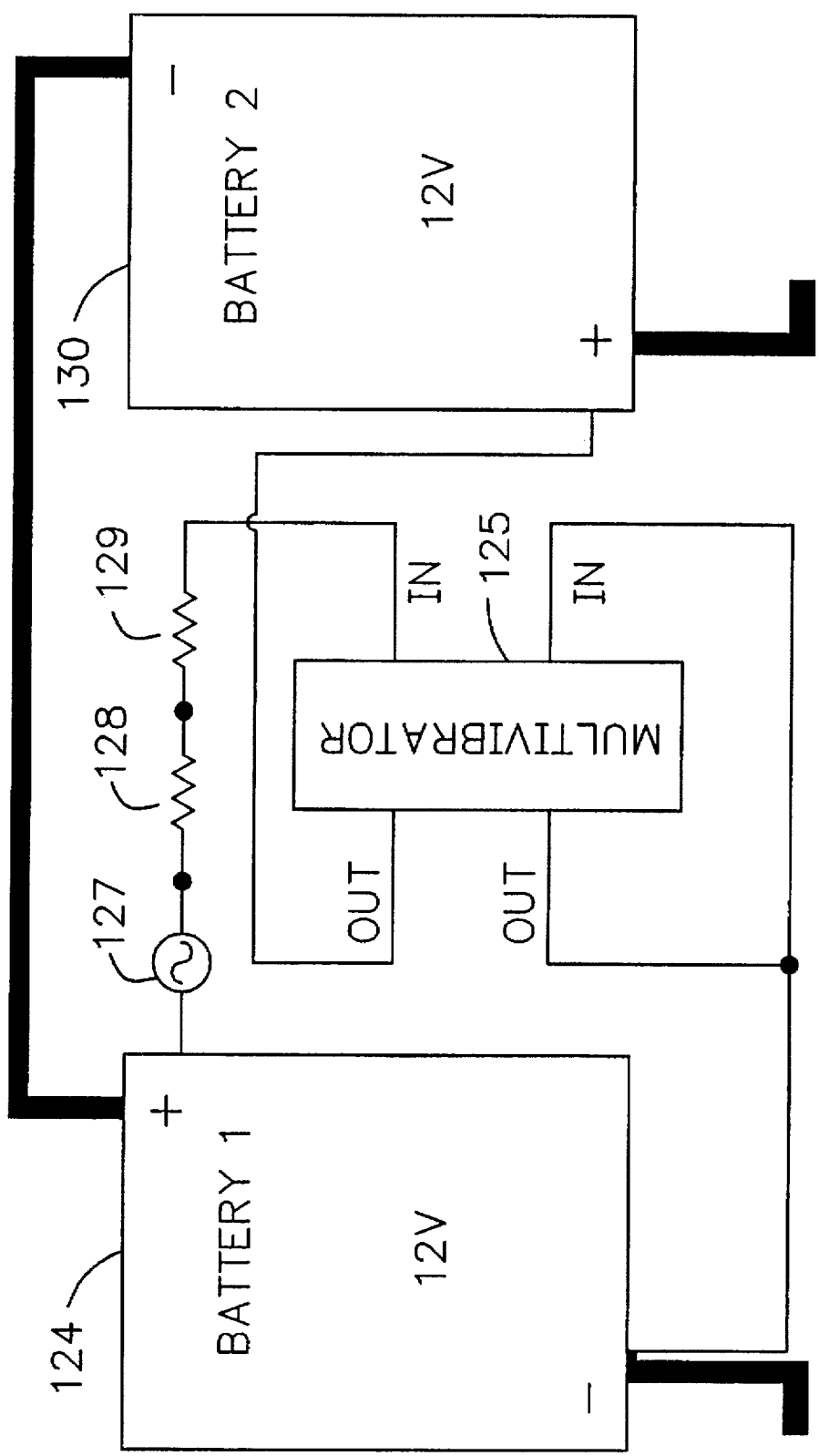
FIG. 2 shows shows a block diagram schematic for a desulfator for two twelve volt batteries connected in series.

FIG. 2 is another embodiment of the system where the device is used to desulfate two 12 volt batteries, 124 and 130 connected in series. For this case the positive output of the multivibrator 126 is connected to the positive terminal of battery number two 130. The negative terminal of battery number one, 124, is connected to the input of the multivibrator 126. This technique can be extended to multiple batteries connected in series. However, should two sets of series connected batteries be connected in parallel with another set of batteries to double the output current, than a desulfator should be used for each set of series connected batteries. In FIG. 2, a fuse 127 is connected in series with resistors 128 and 129 to protect the batteries should a failure of the multivibrator occur.

Figure 3:
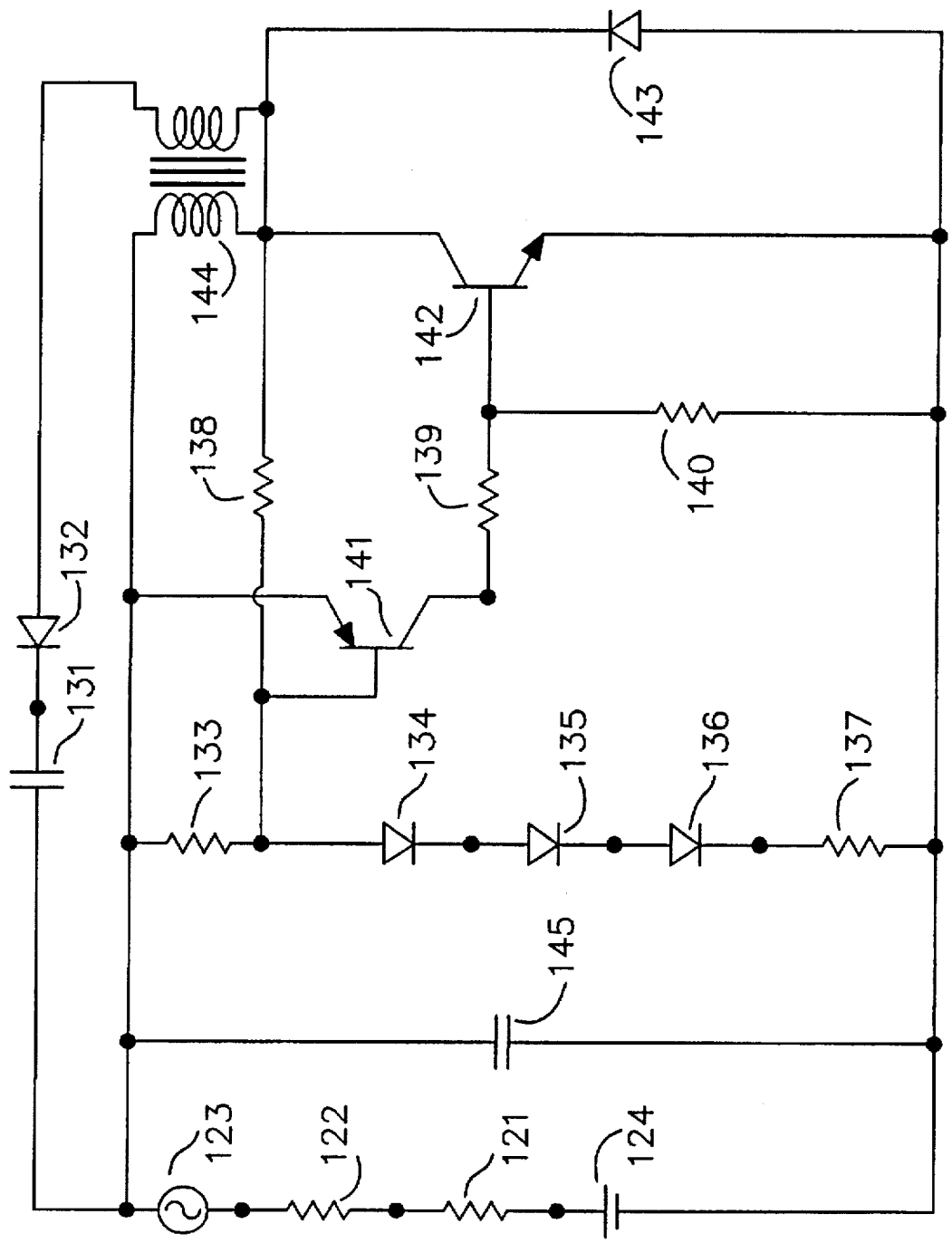
FIG. 3 is a schematic of the desulfator of FIG. 1.

FIG. 3 shows the desulfator schematic of FIG. 1, wherein a 12 volt lead acid (car battery) 124 is connected to internal circuitry within the desulfator multivibrator. The desulfator multivibrator has both its input terminals and output terminals connected directly to the terminal of the lead acid battery 125 through resistors 121, and 122; and fuse 123.

Connections from the lead acid battery 124 are connected to the circuitry of the astable multivibrator circuit through the resistors 121,122 and the fuse 123. The multivibrator circuit is a variation of a standard circuit known to those practicing in this art. Specifically, the positive terminal of the battery is connected through 121 and 122 and 123 across capacitor 145 and through the primary coil of the transformer 144 to the collector of the NPN transistor 142 which has its emitter connected to the negative terminal of the battery 124. The positive battery terminal is also connected through 121,122, and 123 to the emitter of PNP transistor 141 and to the base of 141 via resistor 133 which has a serial connection through diodes 134,135, and 136 and resistor 137 to the negative battery terminal. In addition, the collector of 142 is connected to the base of 141 through resistor 138 and the collector of 141 is connected to the base of 142 through the resistor configuration of 139 and 140. Diode 143, is connected across the collector emitter junction of 142 and the collector of 142 is connected to the secondary side of the transformer through which diode 132 and capacitor 131 are serially connected back to the battery positive terminal through 121, 122, and 123. Capacitor 131 charges and discharges at a frequency determined by the circuit parameters of the multivibrator.

Figure 4:
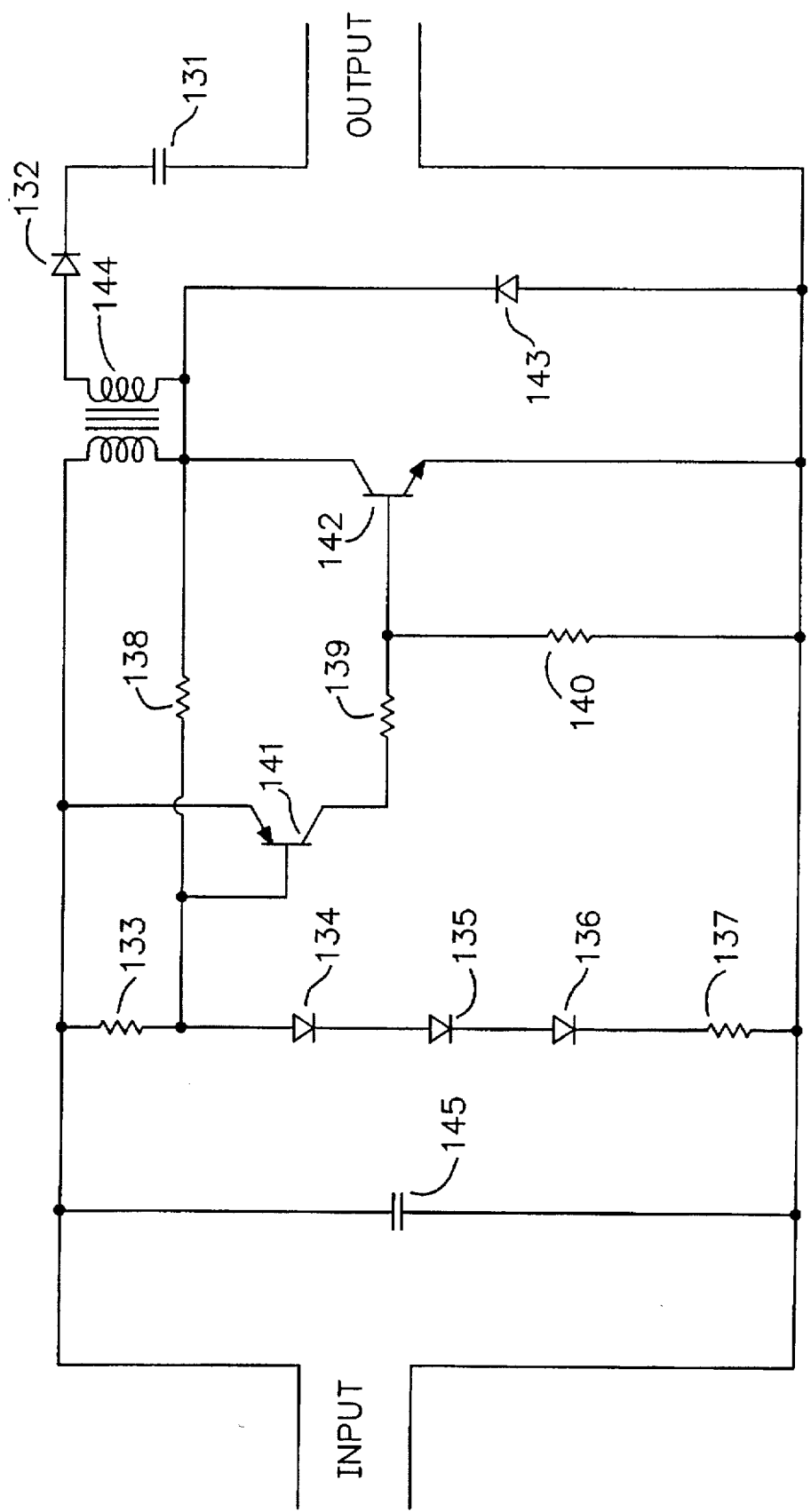
FIG. 4 is a schematic of the desulfator of FIG. 1 minus the fuse and current limiting resistors of FIG. 3.

Referring to FIG. 4, the circuit operates in the following manner:

At a point in time when transistor 141 has just turned on and therefore is conducting current its emitter-collector junction, the voltage drop across the emitter-collector junction is small and a large quantity of electrons flow through resistor 139 and into the base of transistor 142. This current will cause transistor 142 to turn on and open a path through its collector-emitter junction for electrons to flow. This causes electrons to flow through 138 and 142 which in turn develops a large voltage drop across the primary coil of transformer 144. These current levels drain the capacitor 145 whose voltage level begins to drop quickle. As capacitor 145's voltage level drops to a specific level, transistor 141 turns off; this action blocks the flow of electrons to transistor 142 and so 142 also turns off. This situation will cause a large change in voltage across the primary coil of the transformer 144 which is amplified on the secondary side to an even larger potential change. This momentary voltage change is representative of a pulse which is delivered through diode 132 and capacitor 131 to the battery. The dispersal of the pulse allows capacitor 145 to charge slowly and when it reaches a voltage level large enough to turn 141 on again, the whole process repeats. This process continues at a rate of several thousand times per second. The desulfator will slowly discharge a lead-acid battery while delivering a low power high frequency pulse to its lead plates. The application of high frequency pulses inhibits the formation of non-reactive lead sulfate on the plates of lead-acid (starting-lighting-ignition) or SLI batteries. The desulfator is always draining power from the battery and if the vehicle or other mechanized apparatus of which the lead-acid battery is associated is not started, then after a period of time the battery will discharge or achieve a level below the required vehicle starting level.

Figure 6:
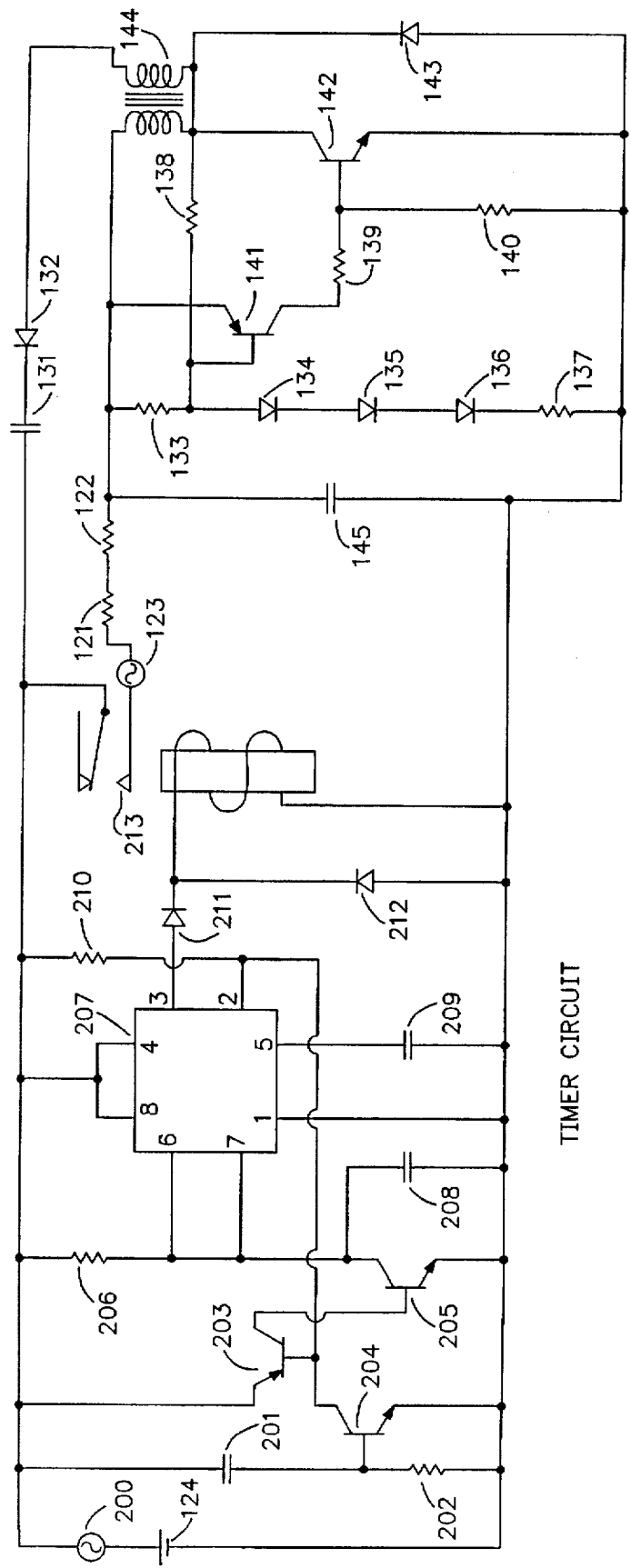
FIG. 6 is a schematic of the desulfator of FIG. 3 with a timer circuit added.

To resolve the problem of the battery discharging below the required level for vehicle starting, a timer is included in the preferred embodiment of the battery desulfator. Referring to FIG. 6, it can be seen that relay 213 connects the desulfator multivibrator input across the battery 124 and fuse 200 which are in series. The timer circuit consisting of semiconductor chip 207 and components 201 through 213 is a standard timing circuit known to those practicing in this art. The timing circuit controls when the desulfator is connected to the battery via a relay 213. When the alternator 99 of the vehicle or mechanized equipment operates, the battery voltage goes above 13.5 volts. This is accomplished when the vehicle or equipment is started. Once the voltage goes above 13.5 volts the relay 213 activates; and the timing circuit keeps the relay 213 energized for a set period of time. In one embodiment the timer was set for 12 to 24 hours. After the set time passes, the timer opens the relay circuit 213 and disconnects the input of the desulfator from the battery 124, effectively turning off the multivibrator. If the vehicle is started again during the set time of the timer circuit, the timer circuit is reset. Power to the timer is supplied by the battery 124. When the vehicle is turned off the timer will maintain the desulfator in the "on" condition for the set time of the timer circuit, so that the desulfator can continue working while the motor of the vehicle is off. In one embodiment, a pulse of 300 ma was delivered for a period of nine days at which time the battery level fell to a level below starting ability. The pulse amplitude level depends on the values of resistors 133 and 138.

Figure 5:
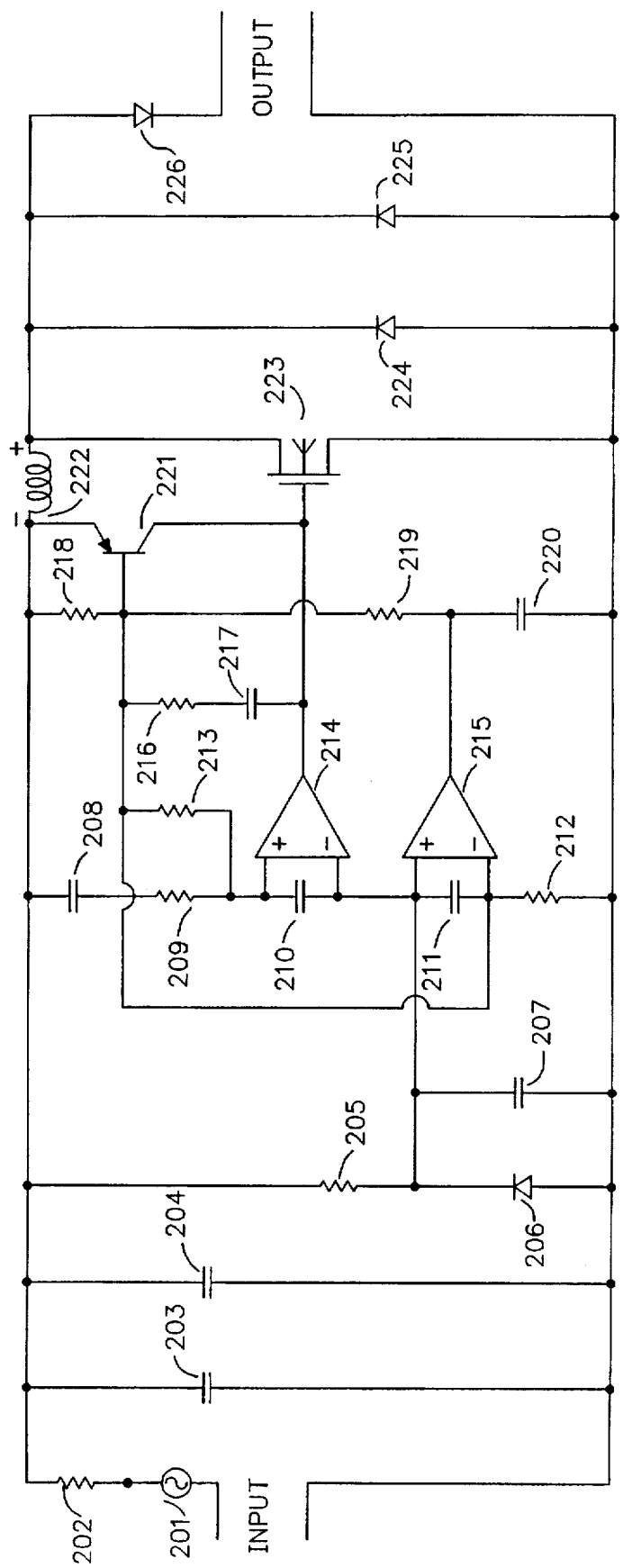
FIG. 5 is a schematic of a desulfator that varies the frequency of the output pulses proportionally to the state of charge of the battery.

FIG. 5 is a schematic drawing of a desulfator with the capability of varying the frequency of the output pulses proportionally to the state of charge of the battery. As the battery voltage drops, the frequency increases. This effectively sweeps a larger range and is more likely to break down the various bonding states of the lead sulfate. Due to the fact that the battery voltage level changes each time the car is started, and also that the battery is slowly discharged when the motor is off, the use of the desulfator results in a practical method to minimize the lead sulfate problem. In FIG. 5, components 205 through 220 comprise the circuitry that varies the frequency of the output pulses as the battery voltage changes. This is a standard circuit in the industry known to those practicing in this art.

What is claimed is:

1. A lead acid (SLI) battery life extender comprising: a lead acid battery for a mechanized apparatus, said lead acid battery having a positive terminal and a negative terminal; a multivibrator circuit connected to said lead acid battery, said multivibrator circuit having a positive input terminal and a positive output terminal, a negative input terminal and a negative output terminal, and wherein said multivibrator circuit positive input terminal is electrically connected to said lead acid battery positive terminal and said multivibrator negative input terminal is electrically connected to said lead acid battery negative terminal, and further wherein said multivibrator positive output terminal is connected to said lead acid battery positive terminal, and said multivibrator negative output terminal is electrically connected to said lead acid battery negative terminal; wherein battery DC voltage of said lead acid battery applied to said multivibrator circuit is transformed into high frequency electrical pulses which are fed back to said lead acid battery thereby removing lead sulfate from the plates of said lead acid battery and thereby increasing the life of said lead acid battery.

2. The lead acid (SLI) battery life extender of claim 1 comprising a resistance for controlling the amount of electrical current flow between said lead acid battery and said multivibrator circuit.

3. The lead acid (SLI) battery life extender of claim 1 comprising a fuse to limit current between said lead acid battery and said multivibrator circuit.

4. The lead acid (SLI) battery life extender of claim 1 wherein said multivibrator circuit further comprises a timer circuit which maintains the multivibrator in an "ON" mode for a period of time after a "start" of said mechanized apparatus, after which said multivibrator is placed in an "OFF" mode by said timer circuit after said period of time.

5. The lead acid (SLI) battery life extender of claim 1 wherein the frequency of said high frequency pulses fed back to said lead acid battery increases as said battery DC voltage decreases wherein the bonding states of the lead sulfate on the plates of said lead acid (SLI) battery are caused to break down.

6. The lead acid (SLI) battery life extender of claim 1 wherein said multivibrator circuit is contained within an enclosure containing said lead acid (SLI) battery.

7. A lead acid battery desulfator for use with mechanized apparatus comprising:

an alternator means on a mechanized apparatus, a lead acid battery means connected to said alternator means to enable said alternator means to charge said lead acid battery means, a lead acid battery desulfator means connected to said lead acid battery means, said desulfator means comprising:

a multivibrator circuit connected to said lead acid battery, said multivibrator circuit having a positive input terminal and a positive output terminal, a negative input terminal and a negative output terminal, and wherein said multivibrator circuit positive input terminal is electrically connected to said lead acid battery positive terminal and said multivibrator negative input terminal is electrically connected to said lead acid battery negative terminal, and further wherein said multivibrator positive output terminal is connected to said lead acid battery positive terminal, and said multivibrator negative output terminal is electrically connected to said lead acid battery negative terminal; wherein battery DC voltage of said lead acid battery applied to said multivibrator circuit is transformed into high frequency electrical pulses which are fed back to said lead acid battery thereby removing lead sulfate from the plates of battery and battery and thereby increasing the life of said lead acid battery.

a timer means connected to said alternator means, said lead acid battery means, and said desulfator means wherein said timer means upon sensing an apparatus startup, energizes said desulfator means for a set period of time during which said desulfator means operates, and at the end of said set period of time the desulfator turns off to prevent said lead acid battery means from discharging to a level below a starting level for said mechanized apparatus.

8. The lead acid battery desulfator of claim 7, wherein said high frequency electrical pulses which are fed back to said lead acid battery increase in frequency as said battery DC voltage of said lead acid battery decreases.

* * * * *